(12) United States Patent
Henderson

(10) Patent No.: US 7,954,322 B2
(45) Date of Patent: Jun. 7, 2011

(54) FLOATING SOLAR ENERGY CONVERSION AND STORAGE APPARATUS

(76) Inventor: Richard L. Henderson, Portland, OR (US)

( * ) Notice: Subject to any disclaimer, the term of this patent is extended or adjusted under 35 U.S.C. 154(b) by 373 days.

(21) Appl. No.: 12/286,485

(22) Filed: Sep. 30, 2008

(65) Prior Publication Data

US 2010/0024422 A1 Feb. 4, 2010

Related U.S. Application Data

(60) Provisional application No. 60/977,986, filed on Oct. 5, 2007.

(51) Int. Cl.
*F03G 6/00* (2006.01)
*B60L 8/00* (2006.01)
*B60K 16/00* (2006.01)

(52) U.S. Cl. ...................... 60/641.9; 60/641.8

(58) Field of Classification Search .................. 60/398, 60/641.1, 641.6, 641.7, 655
See application file for complete search history.

(56) References Cited

U.S. PATENT DOCUMENTS

| | | | |
|---|---|---|---|
| 4,324,983 A | 4/1982 | Humiston | |
| 4,622,949 A * | 11/1986 | Yahalom | 126/567 |
| 5,513,494 A | 5/1996 | Flynn et al. | |
| 2007/0289303 A1 | 12/2007 | Prueitt | |

* cited by examiner

*Primary Examiner* — Thomas E Denion
*Assistant Examiner* — Christopher Jetton
(74) *Attorney, Agent, or Firm* — Mark A. Navarre

(57) ABSTRACT

A solar energy conversion and storage apparatus floats on a body of water and confines and stores a large quantity of solar-heated water for producing electricity with a closed-cycle heat engine. An expansive horizontal structure parallel to the surface of the water confines one or more horizontal layers of water, a distributed array of heat transfer structures gathers solar energy and imparts it to the confined water, and one or more heat engines produce electricity utilizing the temperature differential between the confined water and ambient water. The heat transfer structures can be configured to transfer solar energy to the confined water using a convective process; and some or all of the heat transfer structures can be configured to transfer solar energy to the stored water using a distillation process that optionally produces distilled water as a by-product.

16 Claims, 11 Drawing Sheets

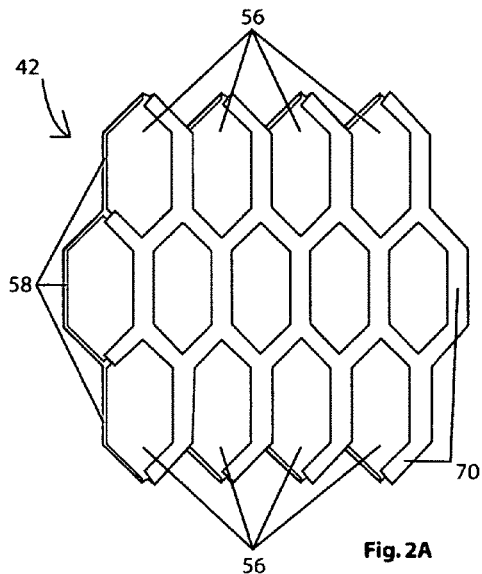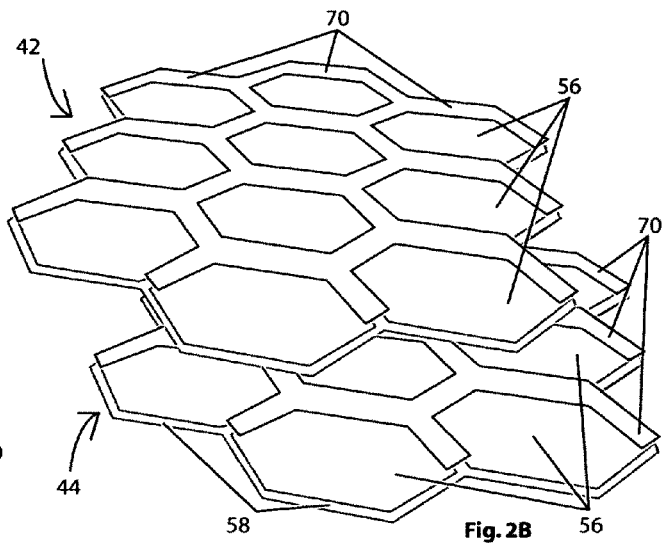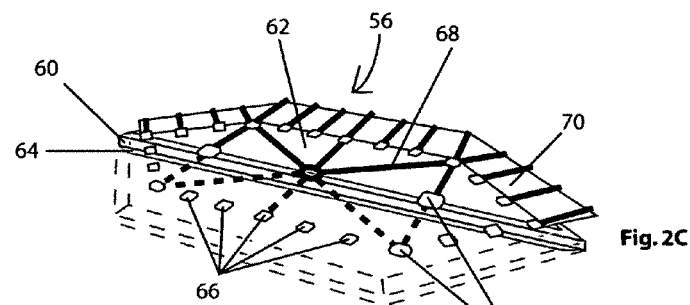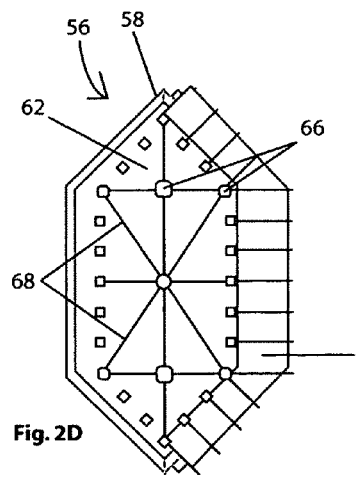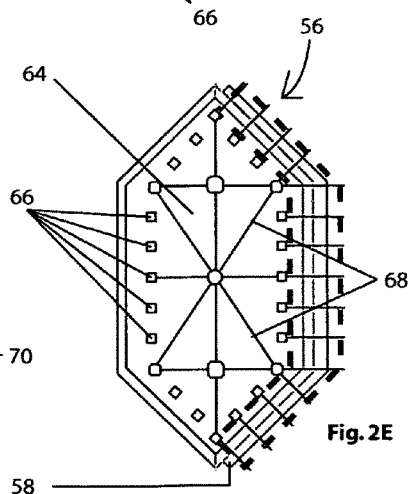

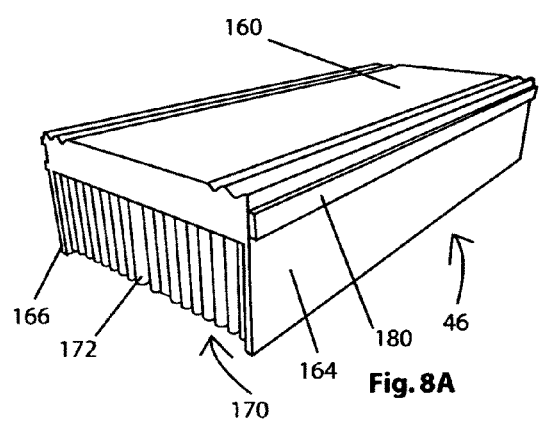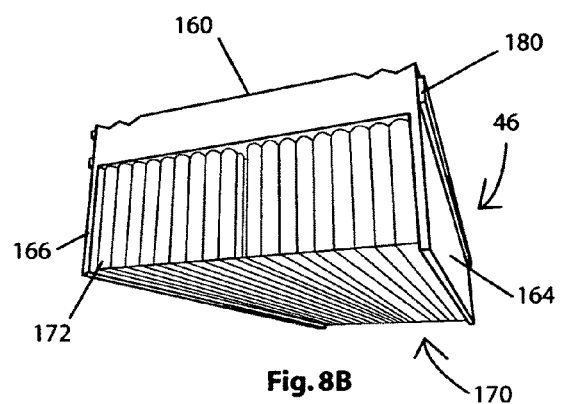
Fig. 8A  Fig. 8B
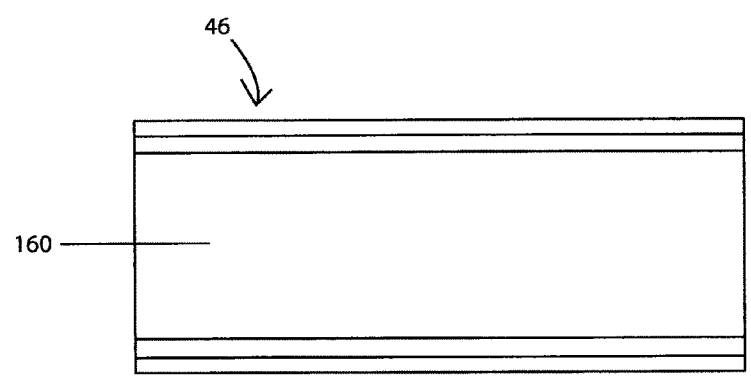
Fig. 8C
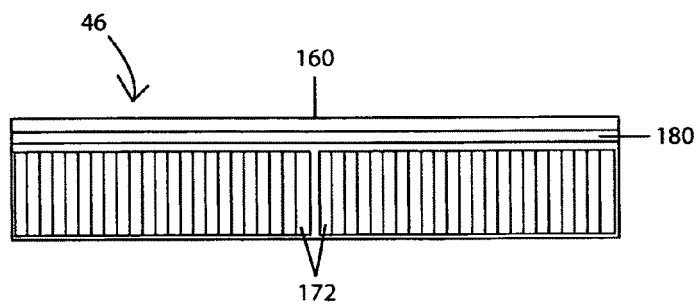
Fig. 8D

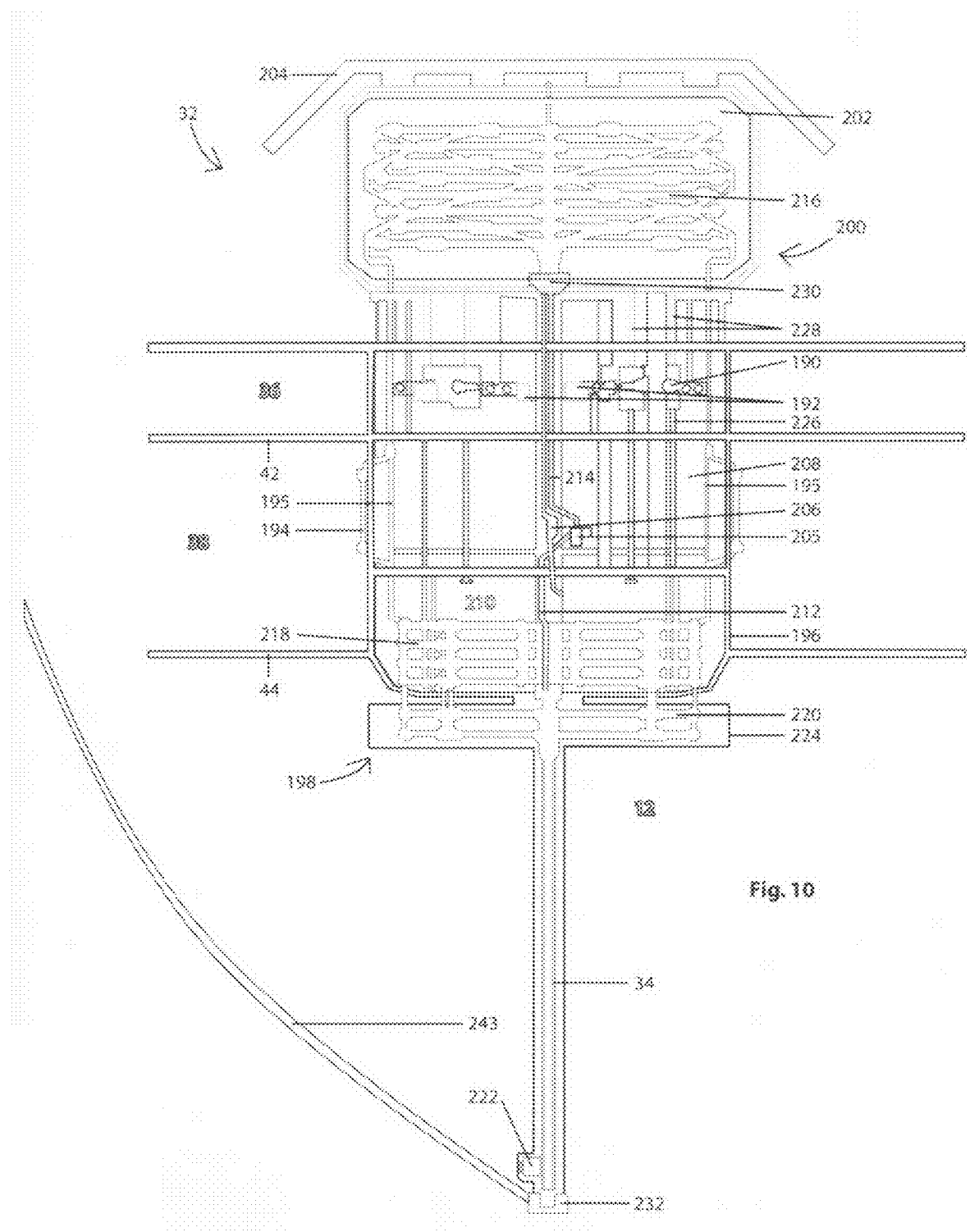

FLOATING SOLAR ENERGY CONVERSION AND STORAGE APPARATUS

RELATED APPLICATIONS

This application claims the filing date of U.S. Provisional Patent Application Ser. No. 60/977,986, filed Oct. 5, 2007.

BACKGROUND OF THE INVENTION

The present invention relates to a floating solar energy conversion and storage apparatus.

BACKGROUND OF THE INVENTION

Scientists recognized long ago the possibility of converting heat energy stored in oceans and other large bodies of water into a more useful form of energy such as electricity. The well-known Ocean Thermal Energy Conversion (OTEC) process utilizes the characteristic difference in temperature (20° C.) between solar-warmed surface water and deep cold water to power a closed-cycle or open-cycle heat engine. The closed-cycle approach utilizes a liquid refrigerant or working fluid (ammonia, for example) having a low boiling point. The warm surface water is pumped through an evaporator to boil the refrigerant and produce vapor for driving a low-pressure turbine-generator; and the cold deep water is pumped through a condenser to condense the spent vapor back into a liquid. In the open-cycle approach, the ocean water itself is the working fluid, and the process of boiling (by flash-evaporation typically) and condensing produces fresh (i.e., desalinated) water as a by-product. There are also hybrid systems that boil warm surface ocean water by flash-evaporation and direct the steam through an evaporator to vaporize a closed-cycle working fluid such as ammonia.

In practice, the above-described OTEC processes have met with only limited success because of the relatively small naturally occurring temperature difference between warm surface water and cold deep water. Accordingly, what is needed is an improved way of harnessing solar energy from a body of ocean or fresh water.

SUMMARY OF THE INVENTION

The present invention is directed to an improved energy conversion and storage apparatus that floats on a body of water and confines and stores a large quantity of solar-heated water for producing electricity with a closed-cycle heat engine. The apparatus includes an expansive horizontal structure parallel to the surface of the water for storing one or more horizontal layers of water, a distributed array of solar collectors for gathering solar energy and imparting it to the stored water, and one or more closed-cycle heat engines for producing electricity utilizing the temperature differential between the stored water and ambient water at a moderate depth such as 30 m. When configured for use in fresh water, the solar collectors can be configured to transfer collected solar energy to the stored water using a convective process; and when configured for use in salt water, some or all of the solar collectors can be configured to transfer collected solar energy to the stored water using a distillation process that produces desalinated water as a by-product.

BRIEF DESCRIPTION OF THE DRAWINGS

FIG. 2A is a diagram of a preferred structure and fabrication method for horizontal barriers that bound the energy conversion and heat storage chambers of FIG. 1;

FIG. 2B depicts upper and lower horizontal barriers constructed as shown in FIG. 2A;

FIG. 2C is an isometric view of an irregular hexagonal section of the horizontal barrier of FIG. 2A;

FIG. 2D is a top view of the irregular hexagonal section of FIG. 2C;

FIG. 2E is a bottom view of the irregular hexagonal section of FIG. 2C;

FIG. 8A is an upper isometric diagram of a roadway according to this invention;

FIG. 8B is a lower isometric diagram of the roadway of FIG. 8A;

FIG. 8C is a top view of the roadway of FIGS. 8A-8B;

FIG. 8D is cross-sectional view of the roadway of FIGS. 8A-8B;

FIG. 10 is a diagram of the heat engine of FIG. 1A.

DESCRIPTION OF THE PREFERRED EMBODIMENT

Figure 1A:
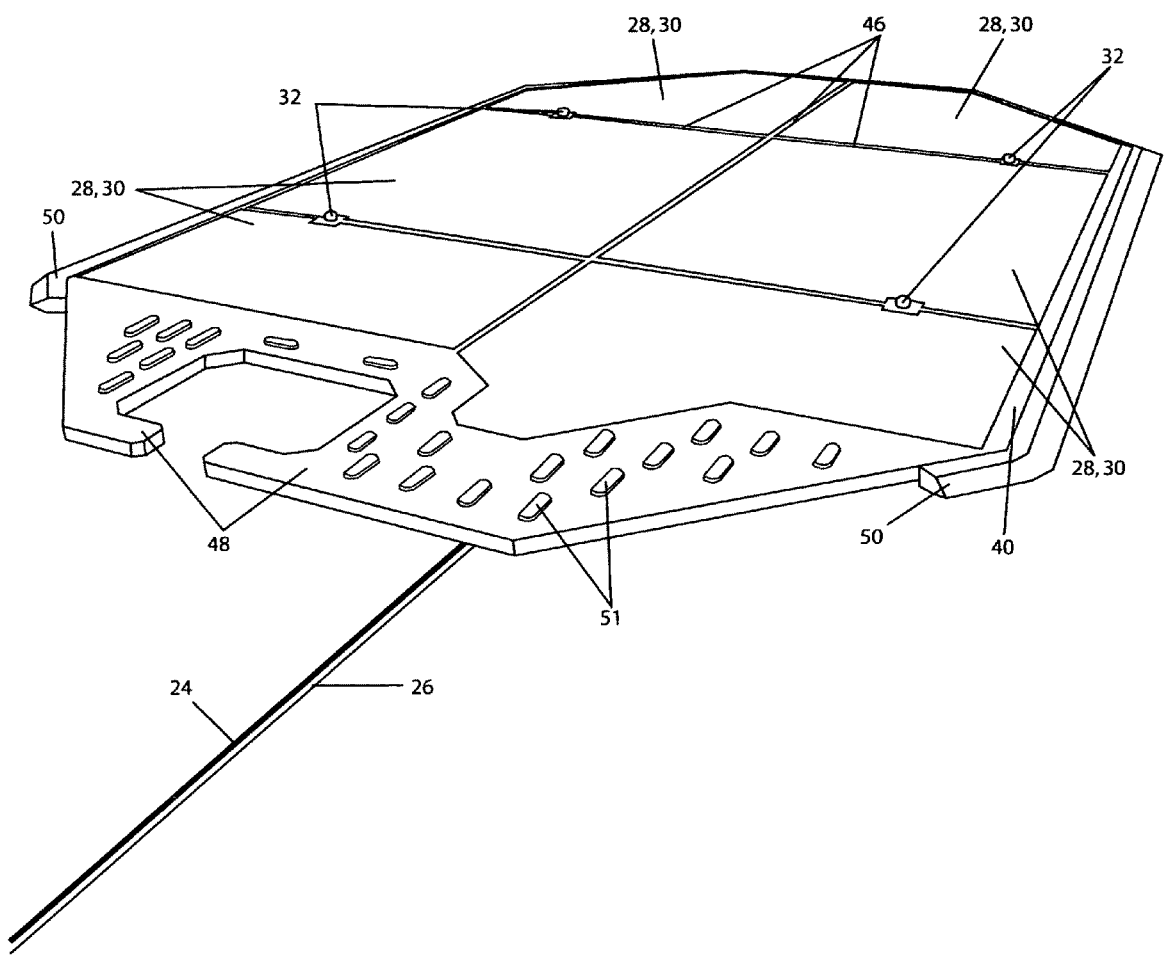
FIG. 1A is an overall isometric diagram of the apparatus of this invention as seen from above.
Figure 1B:
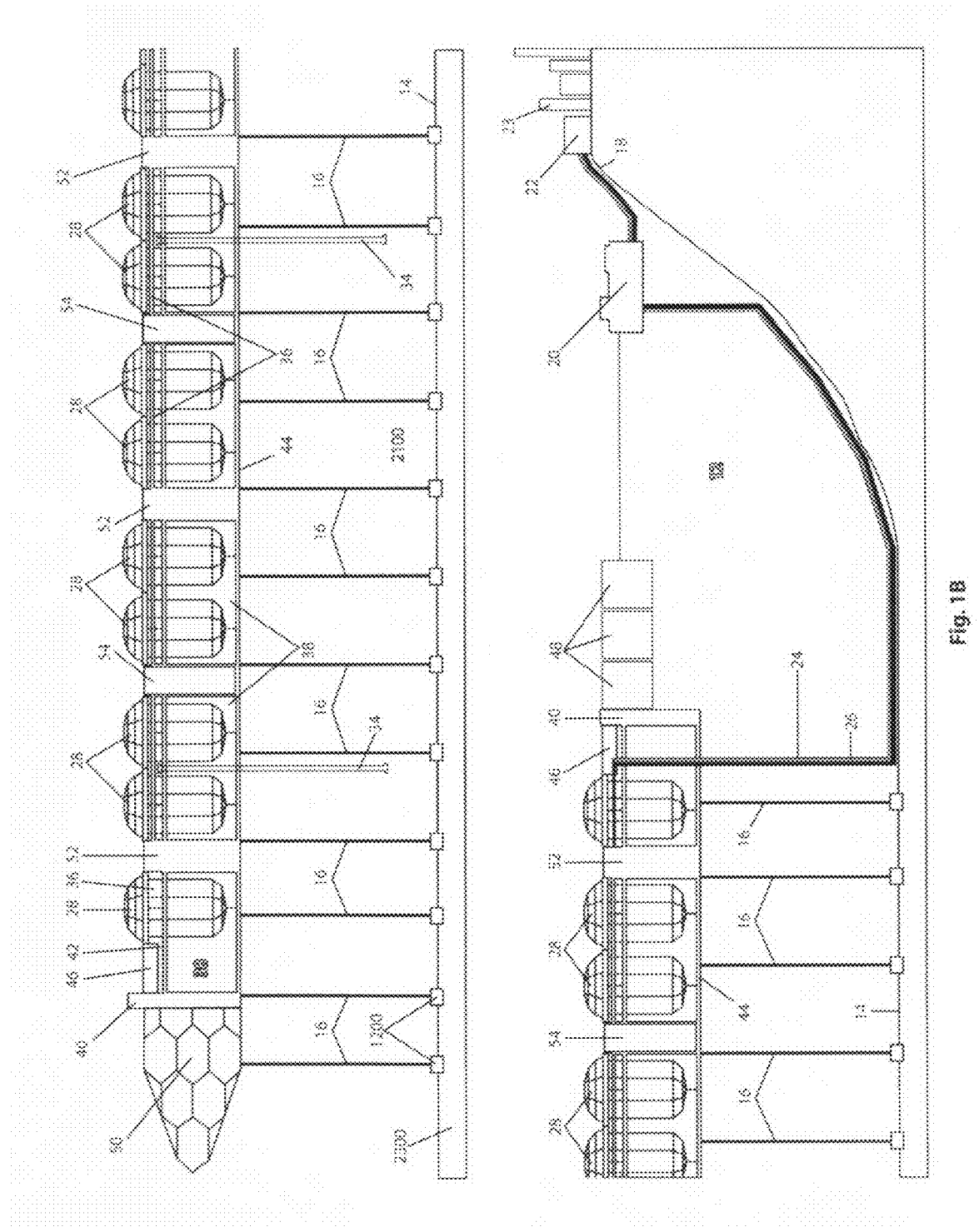
FIG. 1B is a side view of the overall apparatus of FIG. 1, including an energy conversion chamber, a heat storage chamber, convective and non-convective heat transfer structures, pump utility shafts, and drain shafts.

Referring to FIGS. 1A and 1B, the reference numeral 10 generally designates a floating solar energy conversion apparatus according to this invention, configured for off-shore use in a body of seawater 12. The apparatus 10 is anchored to the sea floor 14 by a distributed array of mooring cables 16. For example, the apparatus 10 may be floating in 100 m of seawater, several thousand meters from shore 18. The shore and near-shore facilities include a floating reservoir 20 for storing desalinated water, a pumping facility 22 for transferring desalinated water from reservoir 20 to a water distribution system, and an electricity transfer facility 23 for interfacing the apparatus 10 with a commercial electrical distribution system. Desalinated water produced by the apparatus 10 is transferred to reservoir 20 by a fresh water pipeline 24 extending downward to the seafloor 14, and following the contour of seafloor 14 as shown. And electricity produced by apparatus 10 is transferred to the electricity transfer facility 23 by a set of electrical cables 26 bundled with the pipeline 24. Optionally, an additional conduit may be provided for delivering concentrated mineral seawater to an on-shore processing facility.

In general, the apparatus 10 is a horizontally expansive water containment and heat storage system with a distributed array of heat transfer structures 28, 30 for gathering solar energy and imparting it to the confined water, and one or more closed-cycle heat engines 32 for producing electricity utilizing the temperature differential between the confined water and ambient water drawn from a moderate depth through a set of downwardly extending ambient water heat exchanger conduits 34. In the preferred embodiment, the apparatus 10 includes two horizontally expansive and overlapping chambers 36, 38. The uppermost chamber 36 confines a relatively small volume of seawater (with a depth of about 3 m, for example) on which solar energy impinging on the apparatus 10 is concentrated, and is also referred to herein as the Energy Conversion Chamber, or simply ECC. The lowermost chamber 38 contains a much larger volume of seawater (with a depth of 15 m, for example) for long-term heat storage, and is also referred to herein as the Heat Storage Chamber, or simply HSC. The energy conversion and heat storage chambers 36 and 38 are bounded laterally by a peripheral seawall 40, and vertically by a pair of mutually-parallel horizontal barriers 42, 44 fastened to seawall 40. The barriers 42 and 44 form the upper and lower surfaces of Heat Storage Chamber 38, and the uppermost barrier 42 also forms the bottom surface of Energy Conversion Chamber 36. The heat transfer structures 28, 30 and a network of roadways 46 float on the water stored in the Energy Conversion Chamber 36, defining an atmospheric barrier for the apparatus 10, as well as the upper boundary of Energy Conversion Chamber 36. Floating docks 48 are secured to a shoreward-facing portion of the peripheral seawall 40, and the remainder of seawall 40 is fitted with a sloped wave energy absorber 50 that protects the apparatus 10 from wave-related damage. Additionally, the seawall 40 may be designed to allow for drainage of seawater from very large waves that break over the seawall 40. As illustrated in FIG. 1A, the docks 48 support various structures 51 (storage building and living quarters, for example), and are configured to provide a sheltered docking area 53 for vessels.

As shown in FIG. 1B, the apparatus 10 also includes a distributed array of pumping utility shafts 52 and precipitate drain shafts 54. As described below in reference to FIG. 6, the pumping utility shafts 52 house pumps for circulating closed-circuit heat exchange fluid (double distilled water, for example) though conduits within the heat transfer structures 28, 30. And as described below in reference to FIG. 7, the precipitate drain shafts 54 serve as portals to the seawater beneath apparatus 10 for disposing of surface water from rain and wave action, and accessing submersible pumps used by the heat engines 32 and other ambient water heat exchangers.

As illustrated in FIGS. 2A-2B, the horizontal barriers 42, 44 preferably comprise a matrix of water-impermeable irregular hexagonal plates 56, interlocked by peripheral double-tongue-in-groove features 58 to form an extensive water-impermeable seal. As seen more clearly in FIGS. 2C-2E, each plate 56 comprises a core 60 of pressure-resistant insulation that blocks conduction of infrared energy, sandwiched between upper and lower layers 62, 64 of water-impermeable material. In the illustrated embodiment, the core 60 and upper and lower layers 62, 64 are fastened to each other mechanically by a distributed array of mechanical fasteners 66 and tension-bearing belts 68. Additionally, each of the plates 56 may be fitted with a peripheral skirt 70 of water-impermeable material on three sides that overlaps adjacent plates 56 as shown for enhanced plate-to-plate sealing.

Figure 3:
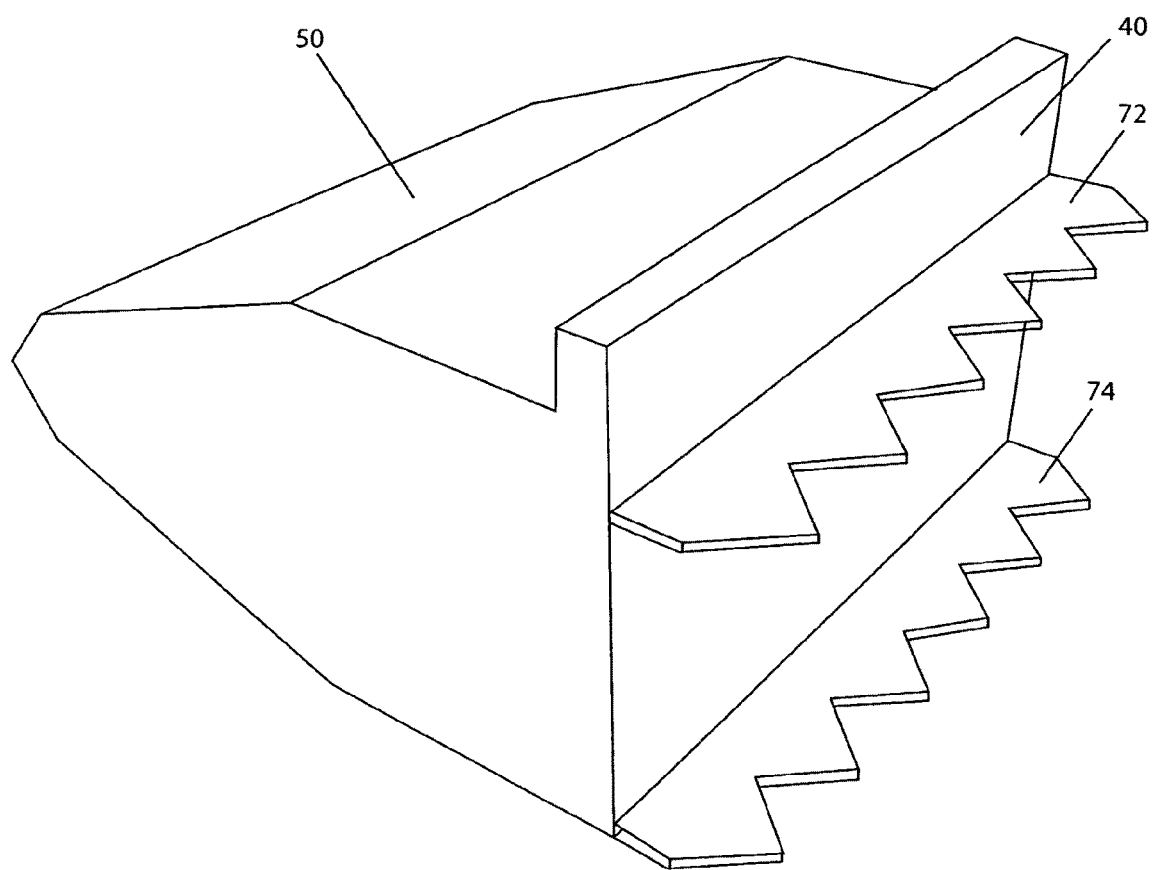
FIG. 3 depicts a seawall and wave energy absorber disposed at a periphery of the apparatus of FIGS. 1A-1B.

At the periphery of the apparatus 10, the plates 56 interface, again by double-tongue-in groove features, with inwardly extending ledges 72, 74 formed on the inboard face of seawall 40. As illustrated in FIG. 3, the ledges 72, 74 are notched to complement the peripheral outline of the hexagonal plate matrix to form a water-impermeable and gap-free peripheral coupling to the seawall 40. FIG. 3 also illustrates a preferred configuration in which the seawall 40, wave energy absorber 50, and ledges 72, 74 are formed as an integral unit of a given width, with like units secured side-by-side about the periphery of the apparatus 10. The dock 48 on the shoreward side of apparatus 10 may be similarly constructed, if desired.

Figure 4:
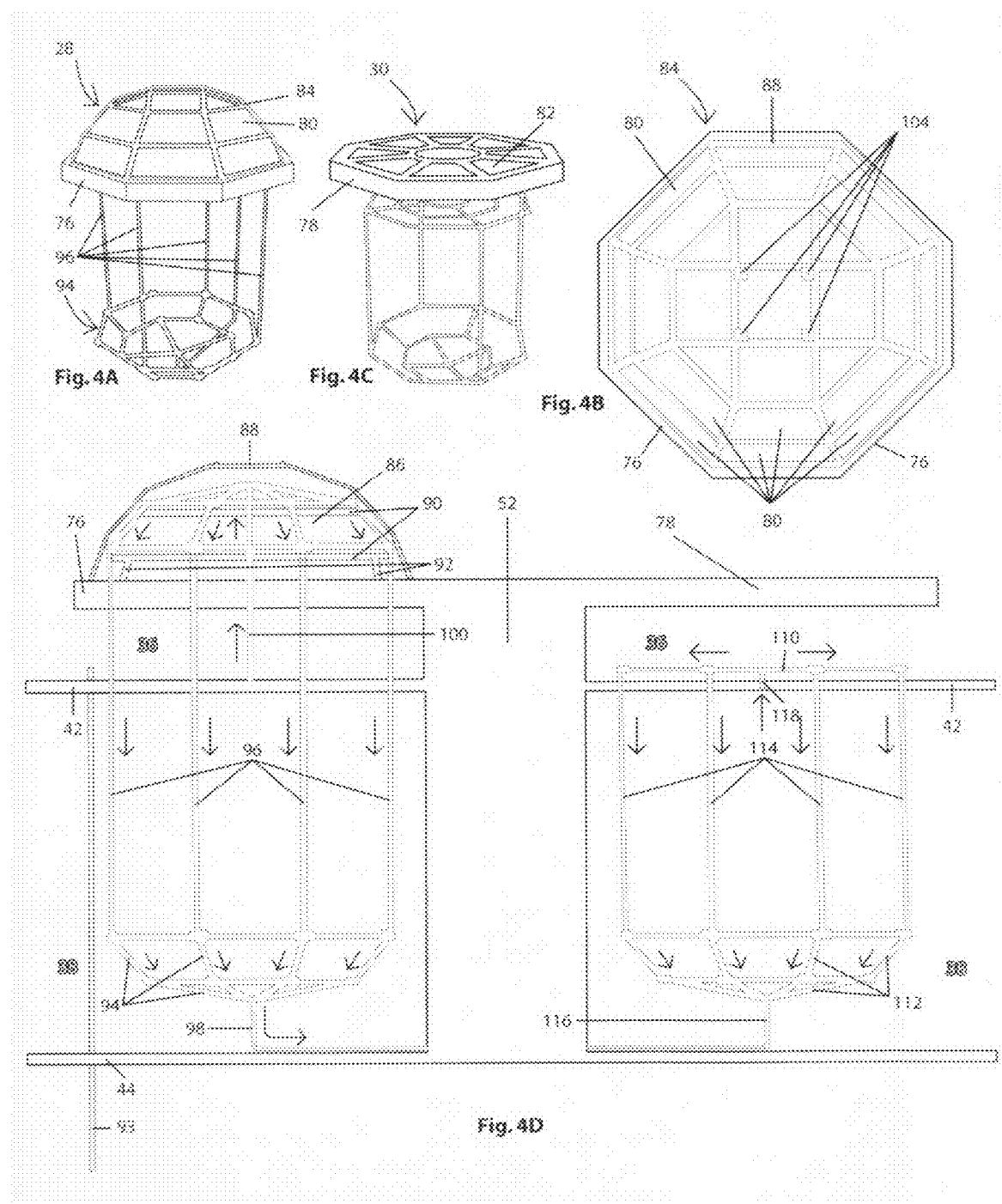
FIG. 4A depicts a convective solar collector according to this invention.
FIG. 4B is a top view of the convective solar collector of FIG. 4A.
FIG. 4C depicts a non-convective solar collector according to a first embodiment of this invention.
FIG. 4D is a side view depicting the convective and non-convective solar collectors of FIGS. 4A and 4C in the context of the apparatus of FIGS. 1A-1B.

As indicated above in respect to FIG. 1, the apparatus 10 includes a distributed array of heat transfer structures 28, 30 floating on the water confined in the Energy Conversion Chamber 36 for admitting solar energy and imparting it to water confined in chambers 36 and 38. In general, the heat transfer structures 28 transfer the collected solar energy to the confined water using a convection and distillation process, while the heat transfer structures 30 transfer the collected solar energy to the confined water using a non-convection or conduction process. Referring to FIGS. 4A and 4C, the heat transfer structures 28, 30 each include a buoyant octagonal base 76, 78 that supports a transparent barriers 80, 82 through which solar radiation penetrates to warm the water in the Energy Conversion Chamber 36. The bases 76, 78 feature peripheral tongue-in-groove couplings so that multiple bases 76, 78 may be arranged in a cluster and interlocked to form a water-tight seal between adjacent bases. Square-shaped or triangular-shaped gaps between bases 76, 78 that are interconnected in this manner are filled with suitably shaped plates (not shown) having a construction similar to that of the horizontal barriers plates 56, and sealed with the adjoining bases 76, 78 and roadways 46.

As illustrated in FIGS. 4A, 4B and 4D, the transparent barrier 80 of each convective heat transfer structure 28 is formed in the shape of a dome 84 to define a vapor chamber 86 between the transparent barrier 80 and the surface of the water in Energy Conversion Chamber 36. The transparent barrier 80, which may comprise sealed sections of argon (or carbon-dioxide) filled double-paned glass, is supported by a hemispherical frame 88 of non-corrosive tubing extending upward from the octagonal base 76. The argon-filled glass of transparent barrier 80 inhibits infrared heat loss; and in latitudes 40 or more degrees North or South of the equator, some of the heat transfer structures 28 may include a reflective coating on some of the transparent panels 80 to optimize solar energy input when the angle of solar incidence is low.

The hemispherical frame 88 of dome 84 also supports a upper hemispherical set of interconnected conduits defining an upper heat exchanger 90, and associated troughs 92, within the vapor chamber 86, a lower hemispherical set of interconnected conduits defining an lower heat exchanger 94, and a distributed array of vertical pipes 96 coupling the upper heat exchanger 90 to the lower heat exchanger 94. Through-fittings are provided in the upper horizontal barrier 42 to accommodate the vertical pipes 96. The upper heat exchanger 90 is disposed in the vapor chamber 86, while the lower heat exchanger 94 is submerged in Heat Storage Chamber 38. Essentially, solar energy collected through the transparent barrier 80 heats the water in Energy Conversion Chamber 36 so that the air in vapor chamber 86 has a high concentration of water vapor, and heat exchange fluid (double distilled water, for example) within the heat exchangers 90, 94 and pipes 96 is circulated to transfer heat energy stored in the vapor to the water confined in the Heat Storage Chamber 38. As described below in respect to FIG. 6, a pump utility shaft 52 located in proximity to the heat transfer structure 28 houses pumps for circulating the heat exchange fluid through heat exchangers 90, 94 and pipes 96. A flexible return pipe 98 connected to the lower heat exchanger 94 is coupled to the inlet of a pump, and a flexible supply pipe 100 connects the outlet of the pump to the upper heat exchanger 90 so that the heat exchange fluid flows in a closed circuit as designated by the arrows in FIG. 4D.

The distillation heat transfer process carried out in each convective heat transfer structure 28 works as follows. The heat exchange fluid circulating through the upper heat exchanger 90 in vapor chamber 86 chills the surface temperature of the conduits comprising heat exchanger 90 to a temperature below the dew point of the vapor-laden air in vapor chamber 86. The latent heat of condensation is thereby transferred from the vapor to the heat transfer fluid in heat exchanger 90. At the same time, the condensate coalesces and drips off the heat exchanger conduits into the underlying troughs 92, which channel the condensate and direct it to a system reservoir (not shown). As the heat exchange fluid passes downward through the vertical pipes 96 and into the lower heat exchanger 94, it releases the absorbed heat of condensation to the water confined in Heat Storage Chamber 38. The temperature of the heat exchange fluid is thereby lowered below the dew point of the air in vapor chamber 86 so that vapor continuously condenses on the upper heat exchanger 90 in vapor chamber 86. The condensate removed via troughs 92 is replaced with fresh seawater via an ambient water delivery pipe 93, which enters the apparatus 10 via suitable through-fittings in the upper and lower horizontal barriers 42 and 44. And since the condensation process gradually increases the salinity of the water confined in Energy Conversion Chamber 36, the water in chamber 36 can be periodically purged and replaced with fresh seawater from the ambient water delivery pipe 93.

The dome 84 of each convective heat transfer structure 30 is additionally equipped with an exhaust fan (not shown) and one-way inlet valve (not shown). The exhaust fan is periodically activated to exchange the air in vapor chamber 86 with fresh atmospheric air to release non-condensing gasses and thereby maximize condensation and the associated heat transfer. Also, the dome 84 is equipped with one or more atmospheric vents 104 that open when the barometric pressure is below the vapor pressure in the vapor chamber 86, as can occur under certain atmospheric conditions.

As illustrated in FIGS. 4C and 4D, the transparent barrier 82 of each non-convective heat transfer structure 30 is planar and horizontal. Similar to the convective heat transfer structures 28, each non-convective heat transfer structure 30 includes a heat exchange fluid circulated through a set of interconnected conduits defining an upper heat exchanger 110, a lower hemispherical set of interconnected conduits defining a lower heat exchanger 112, and a distributed array of vertical pipes 114 coupling the upper heat exchanger 110 to the lower heat exchanger 112. The flexible return pipe 116 couples the lower heat exchanger 114 to the inlet of a pump, and the flexible supply pipe 118 connects the outlet of the pump to the upper heat exchanger 110 so that the heat exchange fluid flows in a closed circuit as designated by the arrows in FIG. 4D. However, the non-convective heat transfer structures 30 have no vapor chamber; the heat exchanger 110 is submerged in the Energy Conversion Chamber 36, and the lower heat exchanger is submerged in the Heat Storage Chamber 38. The heat exchange fluid passing through the upper heat exchanger 110 absorbs heat from the solar-heated water of the Energy Conversion Chamber 36, and then releases the heat to the water stored in the Heat Storage Chamber 38 when it passes through the lower heat exchanger 112. Since the upper heat exchanger 110 is submerged in nearly 3 m of water, the heat exchange fluid remains under substantial pressure. As a result, the heat exchange fluid remains in a liquid state, and transfers heat to the Heat Storage Chamber 398 at a significantly higher temperature than the convective heat transfer process carried out in the heat transfer structures 28.

Figure 5:
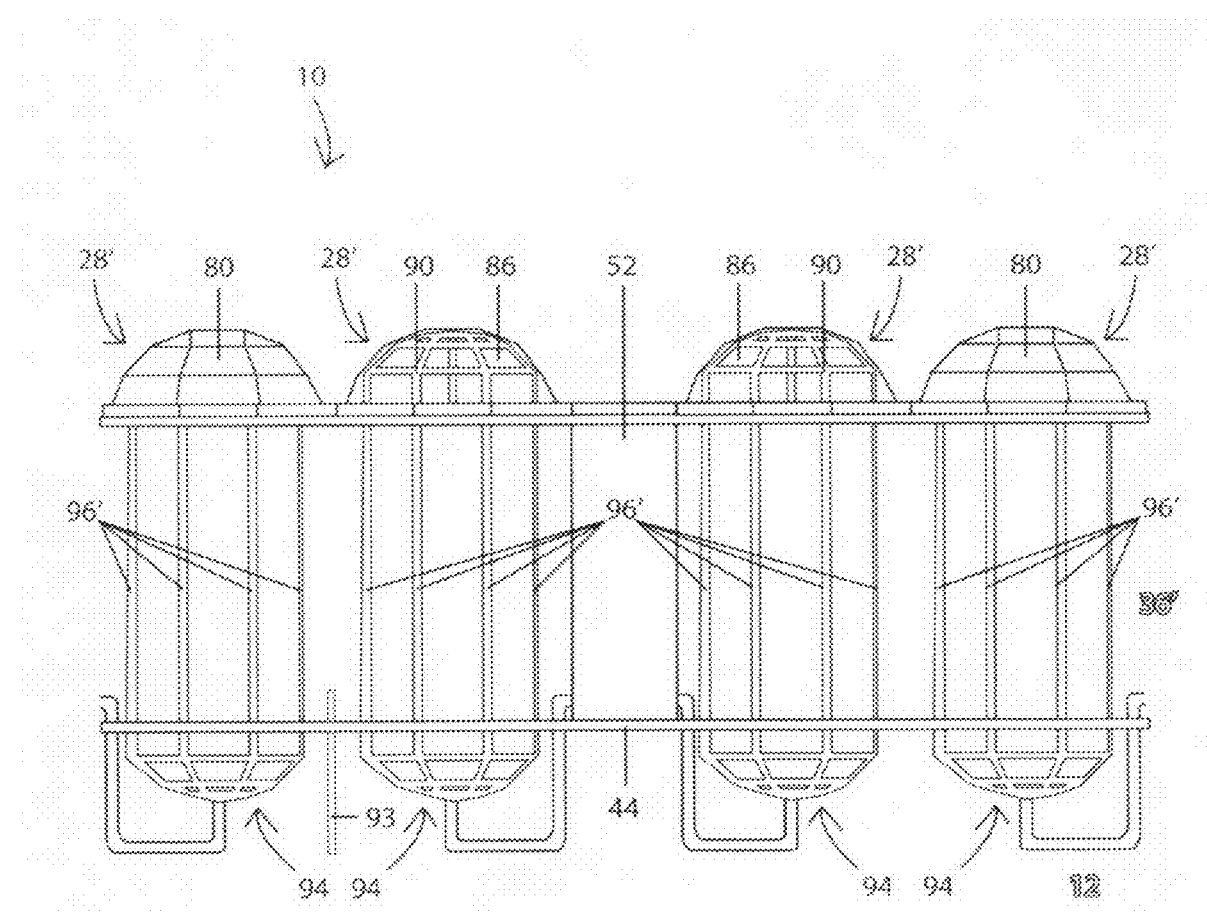
FIG. 5 is a diagram of a non-convective solar collector according to a second embodiment of this invention.

FIG. 5 illustrates an alternate embodiment of the apparatus 10 and convective heat transfer structures 28' that is particularly useful in locations of high solar incidence and relatively warm ambient water, where large amounts of distilled (desalinated) water are desired. In this case, the Energy Conversion Chamber 36 and Heat Storage Chamber 38 are combined into a single chamber 36' that both converts and stores solar energy, and the lower heat exchanger 94 is disposed in the ambient seawater 12. Through-fittings are provided in the horizontal barrier 44 to accommodate passage of the vertical conduits 96. Condensation is enhanced because the heat transfer fluid in the upper heat exchanger 90 is colder due to the chilling effect of the ambient seawater 12 on the heat transfer fluid passing through the lower heat exchanger 94.

Figure 6:
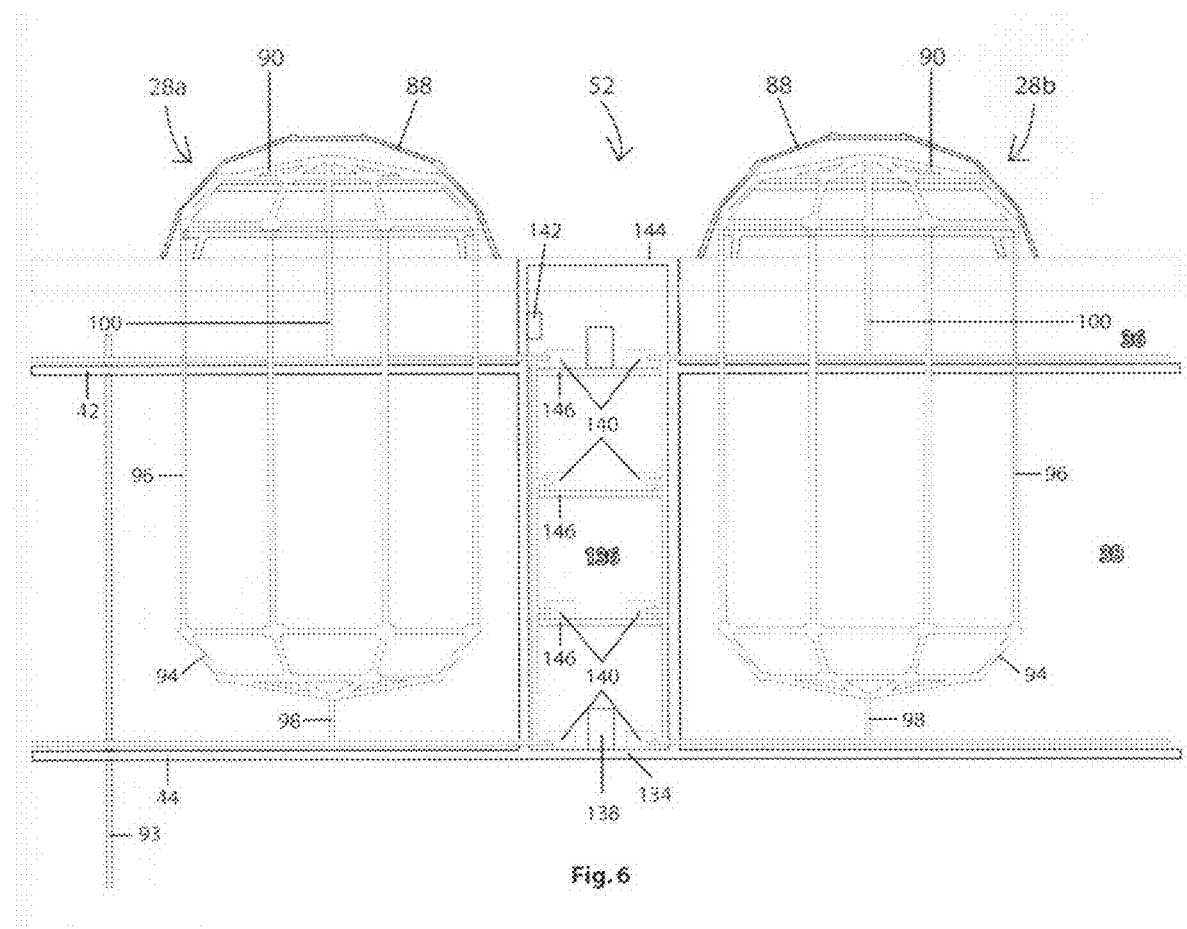
FIG. 6 is a side view of the pump utility shaft of FIG. 1B.

FIG. 6 depicts a pumping utility shaft 52 disposed between a pair of heat transfer structures 28a and 28b, though it will be understood that each pumping utility shaft 52 is equipped with enough pumps to service several heat transfer structures. The side wall 132 and floor 134 seal the utility shaft 52 from Energy Conversion Chamber 36 and Heat Storage Chamber 38 and the ambient seawater 12 to provide a dry chamber 136 at atmospheric pressure for housing various motor-driven pumps 138, 140 and one or more air compressors 142. Sealed through fittings provide leak-proof wall openings for accommodating the return and supply pipes 98, 100, compressed air pipe (not shown), and electrical conduits (also not shown). A removable cover 144 at the top of the chamber 136 provides maintenance access, and a bilge pump 138 located under a grating (not shown) on the floor 134 purges the chamber 136 of any seawater or precipitate that enters through the removable cover 144. The pumps 140 are disposed on peripheral shelves 146 at different levels of the chamber 136, and serve to circulate heat exchange fluid through the heat exchangers of heat transfer structures 28, 30. The heat exchange fluid is delivered to the pumps 140 at the lowest level via the return pipes 98 and then supplied to the corresponding supply pipes 100. The air compressor(s) 142 provide compressed air to the roadways 46 and docks 48 as explained below for maintaining a consistent elevation of the atmospheric barrier.

Figure 7:
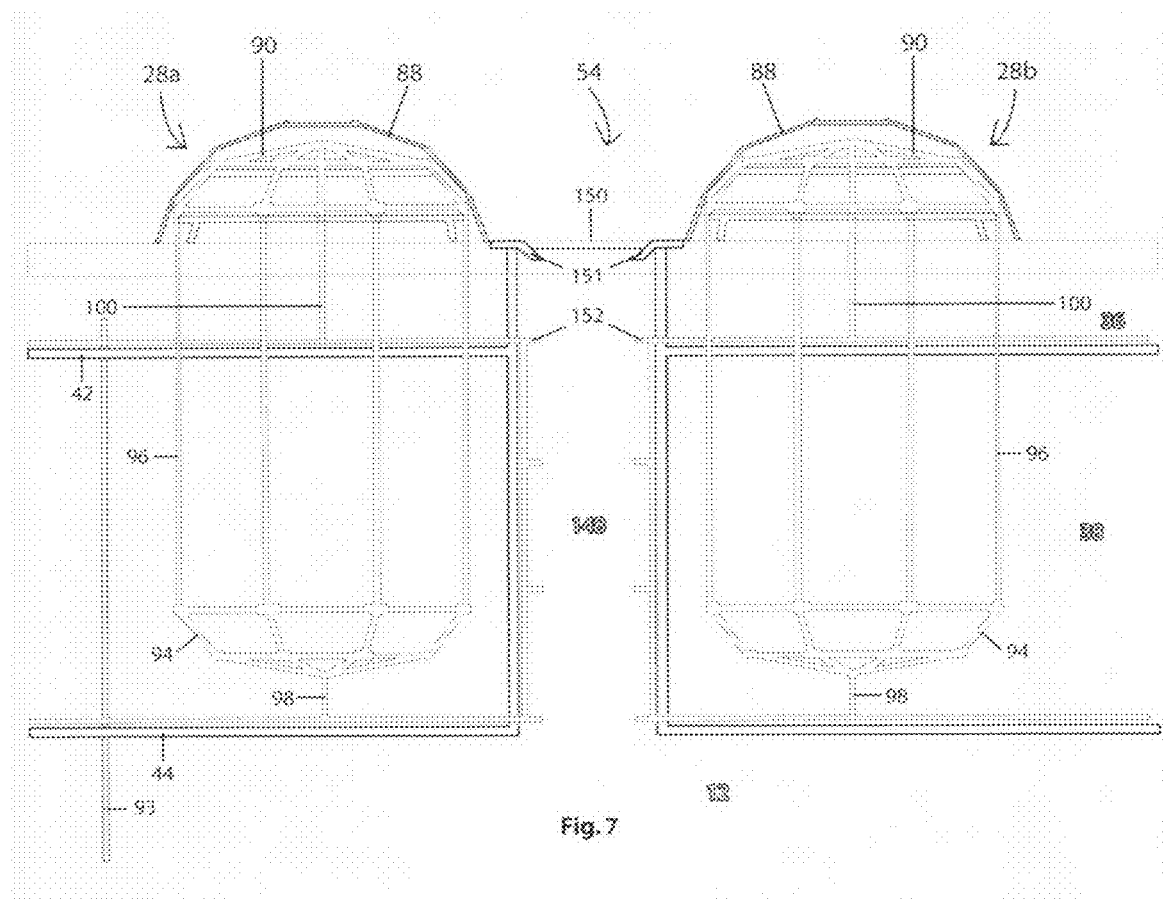
FIG. 7 is a side view of the precipitate drain shaft of FIG. 1B.

FIG. 7 depicts a precipitate drain shaft 54 disposed between a pair of heat transfer structures 28a and 28b. The sidewall 146 seals the precipitate drain shaft 54 from Energy Conversion Chamber 36 and Heat Storage Chamber 38, but the bottom of precipitate drain shaft 54 is open to the ambient seawater 12 as shown. A removable grating 150 covers the top of the drain shaft 54 to drain runoff water and to permit access for maintenance. As mentioned above, the precipitate drain shaft 54 is used to dispose of precipitation and other unwanted water, and also to provide a portal for accessing and servicing submersible pumps used by ambient water heat exchangers. Precipitation and other water at the surface of apparatus 10 enters the precipitation drain shaft 54 via grating 150 and drain pipes 151 located near the top of the shaft 54. And water from nearby bilge pumps 138 enters shaft 54 via evacuation pipes 152. In the illustrated embodiment, the evacuation pipes 152 pass through the sidewall 146 just above the upper horizontal barrier 42. The level of seawater within the precipitation drain shaft 54 is the same as the level of the ambient seawater 12 in which the apparatus 10 floats, and the buoyancy of the apparatus 10 is such that the level of seawater in shaft 54 is a foot or so below the level of precipitation drain pipes 151.

FIGS. 8A-8D depict a section of roadway 46. Each roadway section includes a road surface 160, and a pair of sidewalls 164, 166 defining a flotation chamber 170 below road surface 160. A matrix of vertically oriented hollow ballast tubes 172 are arranged within the flotation chamber 170, such that the upper end of each ballast tube 172 is adapted to receive compressed air from an air conduit (not shown) for controlling the buoyancy of the roadway 46, and the lower end of each ballast tube 172 opens into the water confined by Energy Conversion Chamber 36. The upper ends of the ballast tubes 172 are interconnected by a series of air couplings (not shown) to equalize the air pressure in all of the ballast tubes 172. This, along with a similar mechanism in docks 48, is the principle mechanism for maintaining a consistent elevation of the entire atmospheric barrier. Other conduits such as electrical conduits and distilled water pipes (not shown) may be routed along the roadway 46. When the roadway 46 is disposed adjacent a heat transfer structure 28, 30, a shoulder 180 formed on the sidewall 164 overlaps and seals against the bases 76, 78 of the adjacent heat transfer structures 28, 30.

Figure 9A:
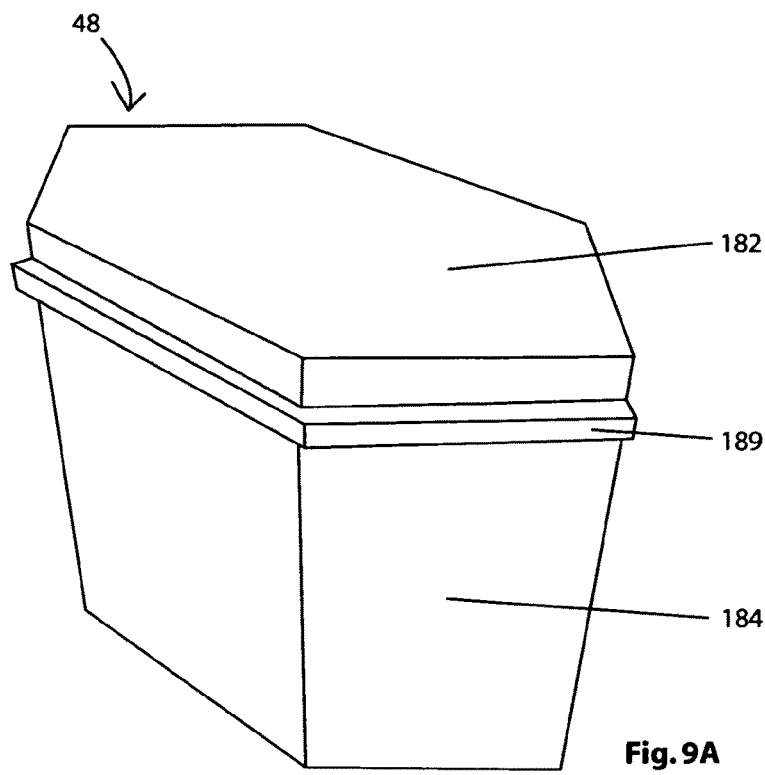
FIG. 9A is an isometric diagram of a dock according to this invention.
Figure 9B:
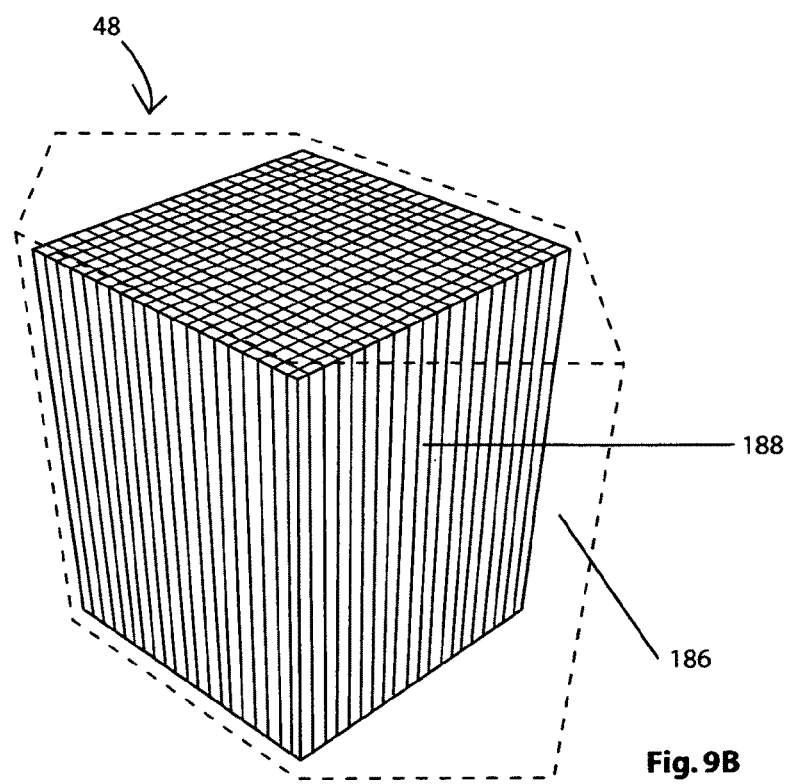
FIG. 9B is an isometric view of a ballast tube matrix inside the dock of FIG. 9A.

As shown in FIGS. 9A and 9B, dock 48 is formed of interlocking irregular hexagonal sections, each comprising an upper working surface 182 and depending sidewalls 184 defining an open-ended flotation chamber 186 within which are arranged a matrix of vertically oriented hollow ballast tubes 188. As with the ballast tubes 172 of roadway sections 46, compressed air is coupled to the upper ends of ballast tubes 188 to control the water level in ballast tubes 188, and hence, the buoyancy of the docks 48. When the dock section 48 is disposed adjacent a heat transfer structure 28, 30, shoulder 189 formed on the adjacent sidewalls 184 overlap and seal against the bases 76, 78 of the heat transfer structures 28, 30.

FIG. 10 depicts one of the closed-cycle heat engines 32 that produce electricity utilizing the temperature differential between the confined water in Heat Storage Chamber 38 and ambient seawater 12 drawn from a moderate depth (100 m, for example) through the ambient water heat exchanger conduit 34. Two thermally coupled closed-loop fluid circuits are used to produce vapor for driving one or more low-pressure turbines 190, which in turn drive one or more generators 192 for producing electricity. A portion of the electricity produced by generators 192 is used within apparatus 10 to power the various motor-driven pumps, air compressors, and other equipment, while the remainder is delivered to on-shore electricity transmission station 23 via the power cables 26 bundled with seabed pipeline 24.

In general, heat exchange (HX) fluid such as double-distilled water is circulated through the first fluid circuit, and a low boiling point working fluid such as ammonia is circulated through the second fluid circuit. Heat is added to the HX fluid by passing all or a portion of it through heat transfer pipes 194 disposed in the Heat Storage Chamber 38, and the heated HX fluid is directed to an evaporator 196 where the heat stored in the HX fluid is used to boil the working fluid to produce vapor for driving the turbines 190. The HX fluid is then chilled by circulating it through an ambient seawater heat exchanger 198, and directed to a condenser 200 where the working fluid vapor used to drive turbines 190 condenses back into a liquid state, transferring its heat to the HX fluid. The liquid working fluid is returned via a high pressure pump to the evaporator 196 to be re-boiled, and additional heat it added to the HX fluid by passing all or a portion of it through heat transfer pipes 194 in Heat Storage Chamber 38, completing the cycle.

Referring more specifically to FIG. 10, the components of heat engine 32 are vertically arranged as shown. The condenser 200 is disposed in an insulated condenser chamber 202 above the horizontal barriers 42, 44, and covered by solar shield 204. The turbines 190, generators 192, and pumps 205, 206 for the HX and working fluid are disposed in a open shaft 208 below the condenser 200. The evaporator 196 is disposed in a sealed evaporator chamber 210 below the open shaft 208, and the ambient seawater heat exchanger 198 is disposed in the ambient seawater 12 below the horizontal barrier 44.

The HX fluid is continuously circulated by the motor-driven HX pump 205. Beginning at the ambient seawater heat exchanger 198, chilled HX fluid is drawn upward through conduit 212 and pumped through conduit 214 to a network of heat transfer pipes 216 in the insulated condenser chamber 202. The HX fluid is warmed due to condensation of working fluid surrounding the pipes 216, and the warmed HX fluid is further heated when it passes through the heat transfer pipes 194 in Heat Storage Chamber 38 enroute to a network of heat transfer pipes 218 in the sealed evaporator chamber 210. The portion of the HX fluid that passes through the heat transfer pipes 194 is controlled via the bypass pipes 195 and a set of valves in chamber 218 to regulate the temperature of the HX fluid supplied to the heat transfer pipes 218 of evaporator 196. After circulating through the heat transfer pipes 216, the HX fluid is directed to a network of heat transfer pipes 220 in the ambient seawater heat exchanger 198. An ambient seawater pump 222 disposed near the bottom of the ambient water heat exchanger conduit 34 pumps cold seawater into a shroud 224 surrounding the heat transfer pipes 220 to chill the HX fluid, whereupon the HX fluid is pumped back to the condenser chamber 202 to complete the cycle. The cold seawater directed to the shroud 224 is exhausted to ambient seawater 12 through exhaust openings (not shown) in shroud 224.

The working fluid is circulated by expansion and by the high pressure pump 206. When the working fluid surrounding the heat transfer pipes 218 in sealed evaporator chamber 210 boils, the expanded working fluid (i.e., vapor) is expelled upward to turbines 190 through insulated pipes 226. Working fluid vapor exhausted from the turbines 190 is directed to the insulated condenser chamber 202 via ducts 228. When the working fluid vapor surrounding the heat transfer pipes 216 in condenser chamber 202 condenses, it collects in a reservoir 230 at the bottom of chamber 202, and is periodically pumped back into the sealed evaporator chamber 210 by the high pressure working fluid pump 206.

As shown in FIG. 10, the flexible ambient water heat exchanger conduit 34 terminates in a marine life barrier and anti-fouling device 232, and a tether 243 such as a cable is connected to the barrier 232 for drawing the pump-end of flexible conduit 34 to the surface of the apparatus for pump maintenance. In particular, the other end of tether 243 is routed up into one of the precipitate drain shafts 54 so that the pump maintenance can be conveniently performed at that location.

In summary, the floating solar energy conversion and storage apparatus 10 of the present invention overcomes many of the drawbacks and limitations of the known OTEC systems. While described with respect to the illustrated embodiments, it is recognized that numerous modifications and variations in addition to those mentioned herein will occur to those skilled in the art. For example, geometric shapes, materials and fluids other than those shown and described herein may be used, and so on. Accordingly, it is intended that the invention not be limited to the disclosed embodiment, but that it have the full scope permitted by the language of the following claims.

The invention claimed is:

1. A floating solar energy conversion and storage apparatus, comprising:
   a horizontally expansive heat storage chamber floating in a body of ambient water and confining a volume of solar heated water;
   a heat engine including an evaporator for vaporizing a working fluid therein, generating means for utilizing vaporized working fluid to produce electricity, and a condenser downstream of the generating means for condensing the vaporized working fluid therein and returning it to the evaporator;
   a first circulating loop of heat exchange fluid that is heated by the confined volume of solar heated water in the heat storage chamber and directed to the evaporator to vaporize the working fluid therein, and that is chilled by said ambient water and directed to the condenser to condense the working fluid therein; and
   an array of heat transfer structures for producing distilled water, each such heat transfer structure including a transparent dome for collecting solar energy and defining a vapor chamber above the water confined in said heat storage chamber, a first heat exchanger suspended in said vapor chamber, and a chilled heat exchange fluid flowing through said first heat exchanger so that water vapor in said vapor chamber condenses on said first heat exchanger to produce said distilled water.

2. The floating solar energy conversion and storage apparatus of claim 1, where said heat transfer structure further comprises:
   a second heat exchanger connected in series with said first heat exchanger, and a pump for producing a circulating flow of heat exchange fluid through a closed circuit including said first and second heat exchangers, said second heat exchanger being disposed in said ambient water so that heat exchange fluid passing through said second heat exchanger is chilled by said ambient water before being circulated through said first heat exchanger.

3. A floating solar energy conversion and storage apparatus, comprising:
   a horizontally expansive heat storage chamber floating in a body of ambient water and confining a volume of solar heated water;
   a heat engine including an evaporator for vaporizing a working fluid therein, generating means for utilizing vaporized working fluid to produce electricity, and a condenser downstream of the generating means for condensing the vaporized working fluid therein and returning it to the evaporator;
   a first circulating loop of heat exchange fluid that is heated by the confined volume of solar heated water in the heat storage chamber and directed to the evaporator to vaporize the working fluid therein, and that is chilled by said ambient water and directed to the condenser to condense the working fluid therein;
   a horizontally expansive energy conversion chamber disposed above said heat storage chamber, and confining a volume of water that is directly heated by solar energy; and
   a distributed array of heat transfer structures for transferring heat from said energy conversion chamber to said heat storage chamber.

4. The floating solar energy conversion and storage apparatus of claim 3, further comprising:
   a transparent barrier floating on the water confined in said energy conversion chamber, and through which the water confined in said energy conversion chamber is directly heated by said solar energy.

5. The floating solar energy conversion and storage apparatus of claim 3, where one or more of said heat transfer structures comprises:
   a domed transparent barrier through which the water confined in said energy conversion chamber is directly heated by said solar energy, said transparent barrier defining a domed vapor chamber above the water confined in said energy conversion chamber;
   a first heat exchanger disposed in said vapor chamber;
   a second heat exchanger submerged in said heat storage chamber; and
   a pump for producing a circulating flow of heat exchange fluid through a closed circuit including said first and second heat exchangers so that heat energy added to said heat exchange fluid due to condensation of water vapor on said first heat exchanger is transferred to the water confined in said heat storage chamber when said heat exchange fluid flows through said second heat exchanger.

6. The floating solar energy conversion and storage apparatus of claim 4, further comprising:
   collection means suspended in said vapor chamber for collecting liquid condensate produced by the condensation of said water vapor on said first heat exchanger; and
   storage means for storing condensate collected by said collection means.

7. The floating solar energy conversion and storage apparatus of claim 4, where:
   said first heat exchanger is defined by a domed array of interconnected conduits suspended in said vapor chamber.

8. The floating solar energy conversion and storage apparatus of claim 4, further comprising:
   at least one pumping utility shaft extending vertically through said energy conversion chamber and said heat storage chamber, said pumping utility shaft having an interior volume occupied by atmospheric air, said pump being housed in said interior volume.

9. The floating solar energy conversion and storage apparatus of claim 3, where one or more of said heat transfer structures comprises:
   a transparent barrier through which the water confined in said energy conversion chamber is directly heated by said solar energy;
   a first heat exchanger submerged in the water confined by said energy storage chamber;
   a second heat exchanger submerged in the water confined by said heat storage chamber; and
   a pump for producing a circulating flow of heat exchange fluid through a closed circuit including said first and second heat exchangers so that solar energy added to said heat exchange fluid in said first heat exchanger is transferred to the water confined in said heat storage chamber when said heat exchange fluid flows through said second heat exchanger.

10. The floating solar energy conversion and storage apparatus of claim 9, where:
    the heat exchange fluid circulated through said closed circuit remains in a liquid state at temperatures above its atmospheric boiling point due to water pressure acting on said first and second heat exchangers.

11. The floating solar energy conversion and storage apparatus of claim 9, further comprising:
    at least one pumping utility shaft extending vertically through said energy conversion chamber and said heat storage chamber, said pumping utility shaft having an interior volume occupied by atmospheric air, said pump being housed in said interior volume.

12. The floating solar energy conversion and storage apparatus of claim 3, further comprising:
   upper and lower horizontal barriers vertically bounding said heat storage chamber, said upper and lower horizontal barriers each comprising a thermally insulated core sandwiched between first and second layers of water-impermeable material; and
   a transparent barrier floating on the water confined in said energy storage chamber, whereby said energy conversion chamber is vertically bounded by said upper horizontal barrier and said transparent barrier.

13. The floating solar energy conversion and storage apparatus of claim 12, where:
   said upper and lower horizontal barriers each comprise a matrix of thermally insulated and water impermeable plates mechanically interlocked with tongue-in-groove couplings.

14. The floating solar energy conversion and storage apparatus of claim 3, further comprising:
   at least one precipitate drain shaft extending vertically through said energy conversion chamber and said heat storage chamber, said precipitate drain shaft being sealed from the water confined in said energy conversion and heat storage chambers, but open to said ambient water beneath said apparatus so that an interior volume of said precipitate drain shaft is occupied by ambient water having a level substantially equal to that of the ambient water in which said apparatus floats.

15. The floating solar energy conversion and storage apparatus of claim 14, further comprising:
   drain means for directing precipitation and waste water to said precipitation drain shaft.

16. The floating solar energy conversion and storage apparatus of claim 14, further comprising:
   an ambient water heat exchanger for chilling said heat exchange fluid;
   an elongate flexible ambient water conduit having a first end connected to said ambient water heat exchanger and a second end normally extending downward into said ambient water;
   a pump disposed near the second end of said of said flexible ambient water conduit for supplying cold ambient water to said ambient water heat exchanger through said flexible ambient water conduit; and
   a tether coupled between the pump and the precipitate drain shaft for drawing the pump up into said precipitate drain shaft for servicing.

* * * * *